United States Patent
Skarve et al.

(10) Patent No.: US 10,992,588 B2
(45) Date of Patent: Apr. 27, 2021

(54) 5G CONGESTION CONTROL (71) Applicant: Telefonaktiebolaget LM Ericsson (publ), Stockholm (SE)

(72) Inventors: Martin Skarve, Enebyberg (SE); Agnes Rensfelt, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 259 days.

(21) Appl. No.: 16/327,411

(22) PCT Filed: Oct. 18, 2017

(86) PCT No.: PCT/SE2017/051024
§ 371 (c)(1),
(2) Date: Feb. 22, 2019

(87) PCT Pub. No.: WO2018/080376
PCT Pub. Date: May 3, 2018

(65) Prior Publication Data
US 2019/0199643 A1 Jun. 27, 2019

Related U.S. Application Data (60) Provisional application No. 62/412,923, filed on Oct. 26, 2016.

(51) Int. Cl.
H04W 28/02 (2009.01)
H04L 12/807 (2013.01)
H04W 80/06 (2009.01)

(52) U.S. Cl.
CPC ............ *H04L 47/27* (2013.01); *H04W 28/02* (2013.01); *H04W 28/0284* (2013.01); *H04W 28/0289* (2013.01); *H04W 80/06* (2013.01)

(58) Field of Classification Search
None
See application file for complete search history.

(56) References Cited

U.S. PATENT DOCUMENTS

2014/0003242 A1  1/2014  Nadas et al.
2014/0286258 A1* 9/2014  Chowdhury ............ H04L 1/188
                                                      370/329

(Continued)

FOREIGN PATENT DOCUMENTS

WO   2009058085 A2   5/2009
WO   2017209671 A1   12/2017

OTHER PUBLICATIONS

Westerberg, E., "4G/5G Ran Architecture: How A Split can Make the Difference", Erickson Technology Review, Jul. 22, 2016, pp. 1-16, retrieved on May 28, 2018, retrieved from Internet: https://www.ericsson.com/49ec87/assets/local/reports-papers/ericsson-technology-review/docs/2016/etr-ran-architecture.pdf.

(Continued)

Primary Examiner — Kodzovi Acolatse
(74) Attorney, Agent, or Firm — Coats & Bennett, PLLC (57) ABSTRACT The overlay of two flow control techniques independently controls the data rate and transmission window size to control congestion in a split radio access architecture comprising a packet processing node (100) that provides user data to one or more baseband processing nodes (200). In particular, the packet processing node (100) determines a data rate for providing the user data to a baseband processing node (200) responsive to air interface feedback received from the baseband processing node (200), and determines a transmission window size for providing user data to the baseband processing node (200) responsive to transport network congestion feedback received from the baseband processing node (200). In so doing, the solution presented (Continued)

herein achieves a high data throughput while also being Internet/TCP compatible.

15 Claims, 8 Drawing Sheets

(56) References Cited

U.S. PATENT DOCUMENTS

| | | | |
|---|---|---|---|
| 2017/0126574 A1* | 5/2017 | Goel | H04L 41/0896 |
| 2017/0127318 A1* | 5/2017 | Goel | H04W 28/0273 |
| 2017/0164236 A1* | 6/2017 | Boldi | H04L 27/2602 |
| 2018/0070373 A1* | 3/2018 | Muench | H04L 47/14 |
| 2018/0083878 A1* | 3/2018 | Francini | H04L 47/33 |
| 2019/0174561 A1* | 6/2019 | Sivavakeesar | H04W 48/12 |

OTHER PUBLICATIONS

CMCC, "NR RAN functional description", 3GPP TSG RAN WG3 #92, Nanjing, China, May 23, 2016, pp. 1-6, R3-161267, 3GPP.

\* cited by examiner

5G CONGESTION CONTROL

The solution presented herein generally relates to congestion control for any data system with traffic sent between at least two nodes, and more particularly to congestion control for the 5G split architecture concerned with both air interface congestion and transport network congestion. The solution presented herein may also be used for other systems with two or more nodes and a non-ideal data transport between, for example, WCDMA.

BACKGROUND

Figure 1:
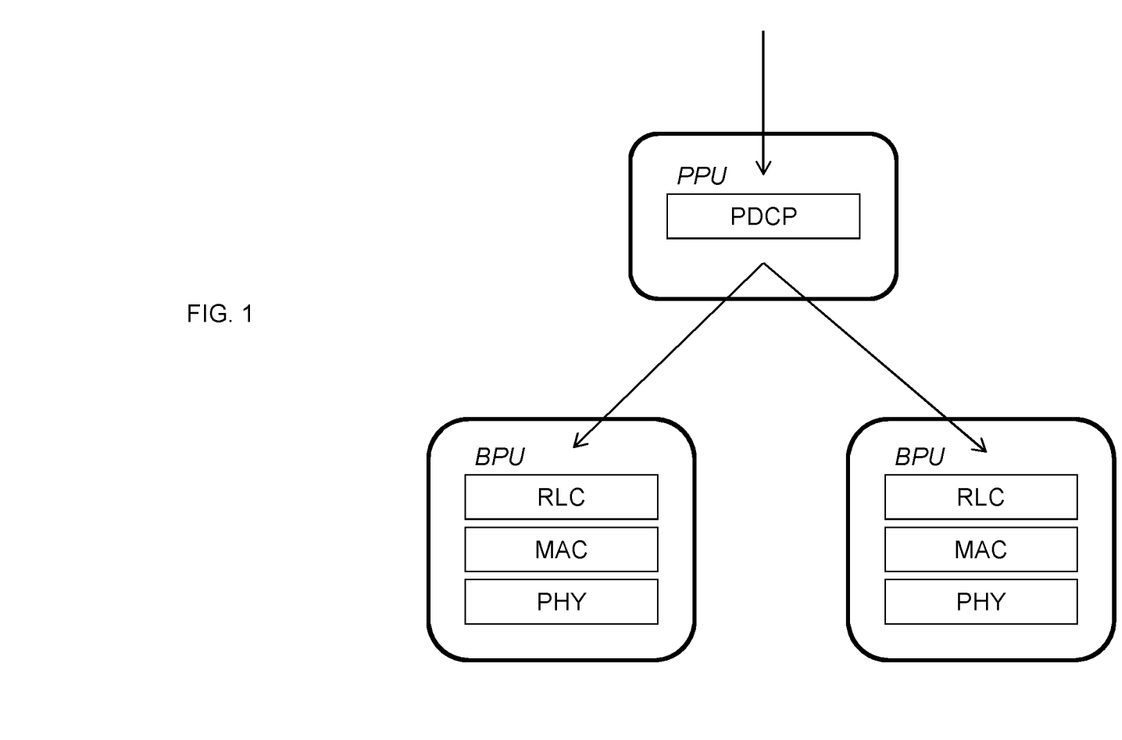
FIG. 1 shows a block diagram of one exemplary split architecture system.

The 5G split architecture divides the LTE Digital Unit into 2 nodes: a packet processing unit (PPU) and one or more baseband processing units (BPUs), as shown in FIG. 1. It will be appreciated that the PPU and BPU may also be referred to as the Central Unit (CU) and Distributed Unit (DU), respectively, e.g., as for 3GPP. Each (radio) bearer will have one bearer buffer in the PPU. User data is then scheduled from the bearer buffer in the PPU via one or more BPUs and down to the UE. The difference compared to the traditional LTE eNB is that the 5G split architecture RAN will include a front-haul transport.

The transfer of data over the front-haul is controlled for best performance. This means that the bottleneck buffer is controlled at least when in congestion. Conventional congestion control solutions may achieve a high data throughput, e.g., using multi-leg transfers as with Dual Connectivity, or may be Internet/TCP (Transmission Control Protocol) compatible. Both goals, however, are currently not achievable. Thus, there remains a need for improved congestion control solutions, particularly in split architecture systems.

SUMMARY

The solution presented herein overlays two flow control techniques to independently control the data rate and window size for data packets. In so doing, the solution presented herein achieves a high data throughput while also being Internet/TCP compatible.

One embodiment comprises a method of controlling congestion in a split radio access architecture comprising a packet processing node operatively connected to one or more baseband processing nodes. The method is implemented in the packet processing node. The method comprises receiving, from a baseband processing node, first feedback corresponding to air interface congestion between the baseband processing node and a wireless device receiving packets from the baseband processing node, and receiving, from the baseband processing node, second feedback corresponding to transport network congestion of a transport interface between the packet processing node and the baseband processing node. The method further comprises determining a data rate for providing user data to the baseband processing node responsive to the first feedback, and determining a transmission window size for providing the user data to the baseband processing node responsive to the second feedback. The method further comprises transmitting the user data to the baseband processing node according to the determined data rate and the determined transmission window size.

One embodiment comprises a packet processing node in a split radio access architecture comprising the packet processing node and one or more baseband processing nodes. The packet processing node comprises a receiver, a data rate circuit, a transmission window circuit, and a transmitter. The receiver is configured to receive, from a baseband processing node, first feedback corresponding to air interface congestion between the baseband processing node and a wireless device receiving packets from the baseband processing node, and receive, from the baseband processing node, second feedback corresponding to transport network congestion of a transport interface between the packet processing node and the baseband processing node. The data rate circuit is operatively connected to the receiver and is configured to determine a data rate for providing user data to the baseband processing node responsive to the first feedback. The transmission window circuit is operatively connected to the receiver and is configured to determine a transmission window size for providing the user data to the baseband processing node responsive to the second feedback. The transmitter is configured to transmit the user data to the baseband processing node according to the determined data rate and the determined transmission window size to control congestion when providing the user data to the baseband processing node.

One embodiment comprises a packet processing node in a split radio access architecture comprising the packet processing node and one or more baseband processing nodes. The packet processing node comprises a receiver module, a data rate module, a transmission window module, and a transmitter module. The receiver module is configured to receive, from a baseband processing node, first feedback corresponding to air interface congestion between the baseband processing node and a wireless device receiving packets from the baseband processing node, and receive, from the baseband processing node, second feedback corresponding to transport network congestion of a transport interface between the packet processing node and the baseband processing node. The data rate module is configured to determine a data rate for providing user data to the baseband processing node responsive to the first feedback. The transmission window module is configured to determine a transmission window size for providing the user data to the baseband processing node responsive to the second feedback. The transmitter module is configured to transmit the user data to the baseband processing node according to the determined data rate and the determined transmission window size to control congestion when providing the user data to the baseband processing node.

One embodiment comprises a computer program comprising instructions which, when run on one or more processing circuits in a packet processing node, causes the packet processing node to carry out a method of controlling congestion in a split radio access architecture comprising the packet processing node that provides user data to one or more baseband processing node. The instructions, when run on the one or more processing circuits cause the packet processing node to receive, from a baseband processing node, first feedback corresponding to air interface congestion between the baseband processing node and a wireless device receiving packets from the baseband processing node, and receive, from the baseband processing node, second feedback corresponding to transport network congestion of a transport interface between the packet processing node and the baseband processing node. The instructions, when run on the one or more processing circuits further cause the packet processing node to determine a data rate for providing user data to the baseband processing node responsive to the first feedback, and determine a transmission window size for providing the user data to the baseband processing node responsive to the second feedback. The instructions, when run on the one or more processing circuits further cause the packet processing node to transmit the user data to the baseband processing node according to the determined data rate and the determined transmission window size.

One embodiment comprises a packet processing node in a split radio access architecture comprising the packet processing node and one or more baseband processing nodes. The packet processing node is configured to receive, from a baseband processing node, first feedback corresponding to air interface congestion between the baseband processing node and a wireless device receiving packets from the baseband processing node, and receive, from the baseband processing node, second feedback corresponding to transport network congestion of a transport interface between the packet processing node and the baseband processing node. The packet processing node is further configured to determine a data rate for providing user data to the baseband processing node responsive to the first feedback, and to determine a transmission window size for providing the user data to the baseband processing node responsive to the second feedback. The packet processing node is further configured to transmit the user data to the baseband processing node according to the determined data rate and the determined transmission window size to control congestion when providing the user data to the baseband processing node.

One exemplary embodiment comprises a method, implemented in a baseband processing node, of controlling congestion in a split radio access architecture comprising a packet processing node that provides user data to the baseband processing node. The method comprises determining a transport network congestion responsive to data packets received via a transport interface between the packet processing node and the baseband processing node, and determining a window size defining a volume of data transmissions associated with the packet processing node responsive to the determined transport network congestion. The method further comprises providing the window size to the packet processing node.

One exemplary method comprises a computer program comprising instructions which, when run on one or more processing circuits in a baseband processing node, causes the baseband processing node to determine a transport network congestion responsive to data packets received via a transport interface between the packet processing node and the baseband processing node, and to determine a window size defining a volume of data transmissions associated with the packet processing node responsive to the determined transport network congestion. The instructions, when run on the one or more processing circuits in the baseband processing node, further cause the baseband processing node to provide the window size to the packet processing node One exemplary embodiment comprises a baseband processing node in a split radio access architecture comprising a packet processing node that provides user data to the baseband processing node. The baseband processing node comprises a receiver, a transport network congestion circuit, and a transmitter. The receiver is configured to receive data packets via a transport interface between the packet processing node and the baseband processing node. The transport network congestion circuit is operatively connected to the receiver and is configured to determine a transport network congestion responsive to the received data packets, and to determine a window size defining a volume of data transmissions associated with the packet processing node responsive to the determined transport network congestion. The transmitter is operatively connected to the transport network congestion circuit and is configured to provide the window size to the packet processing node.

One exemplary embodiment comprises a baseband processing node in a split radio access architecture comprising a packet processing node that provides user data to the baseband processing node. The baseband processing node comprises a receiver module, a transport network congestion module, and a transmitter module. The receiver module is configured to receive data packets via a transport interface between the packet processing node and the baseband processing node. The transport network congestion module is configured to determine a transport network congestion responsive to the received data packets, and to determine a window size defining a volume of data transmissions associated with the packet processing node responsive to the determined transport network congestion. The transmitter module is configured to provide the window size to the packet processing node.

One exemplary embodiment comprises a baseband processing node in a split radio access architecture comprising a packet processing node that provides user data to the baseband processing node. The baseband processing node is configured to receive data packets via a transport interface between the packet processing node and the baseband processing node. The baseband processing node is further configured to determine a transport network congestion responsive to the received data packets, and to determine a window size defining a volume of data transmissions associated with the packet processing node responsive to the determined transport network congestion. The baseband processing node is further configured to provide the window size to the packet processing node.

DETAILED DESCRIPTION

The solution presented herein uses two congestion control techniques, data rate control functionality and transmission window control functionality, operating in parallel to simultaneously provide high data throughput and Internet/TCP compatibility for data transmissions between two network nodes, e.g., the packet processing unit/node (PPU) and baseband processing units/nodes (BPUs) shown in FIG. 1. Data rate control functionality occurs between the nodes (as, e.g., used by WCDMA RAN) controlling the data rate sent from a packet processing unit (PPU) to the one or more baseband processing units (BPUs). Such data rate control has the benefit of accurate control of the BPU user data buffer, and thus provides high data throughput, especially at Dual or Multi-connectivity. However, such data rate control is not fully Internet/TCP compatible, i.e., it may starve if combined with TCP traffic. In particular, where one data flow may be starved within seconds when the other data flow is sent on the same transport, which causes a transport bottleneck, and thus causes congestion. Internet/TCP compatibility reduces such data starvation.

Transmission window control functionality controls the size of the allowed transmission window (i.e., mainly TCP congestion control). The size of the transmission window defines the maximum data volume, e.g., number of packets, allowed "in flight" (e.g., those transmitted packets for which an acknowledgement has not yet been received). In other words, the transmission window control functionality controls the data volume allowed in flight. The algorithm is stable and can coexist with Internet/TCP.

For the 5G split architecture scenario (e.g., shown in FIG. 1) we expect the congestion control functionality to control the data transfer individually for each bearer buffer, based on the need for very accurate control of the BPU user date buffer. This is especially applicable for Dual Connectivity.

The solution presented herein overlays two separate congestion control techniques between two nodes (e.g., the PPU and BPU), to perform data rate control and transmission window control separately and at the appropriate occasion. The solution presented herein is described in terms of data flow between two network nodes, e.g., nodes of a split architecture. Exemplary nodes include, but are not limited to a packet processing node and a baseband processing node, generally referred to herein as PPU 100 and BPU 200, respectively. In some embodiments, the functionality associated with the PPU 100 may comprise virtualized functionality implemented on a processing circuit, while the functionality associated with the BPU 200 may be implemented in a radio base station (or equivalent network node). In any event, it will be appreciated that while the PPU 100 and BPU 200 may be co-located within one network location, these nodes are generally not co-located.

As used herein, "overlay" refers the execution of both congestion control techniques, e.g., in parallel, such that one technique does not limit, impact, or interact with the other technique. In other words, overlaying the two congestion control techniques requires no coordination between the two congestion control techniques. As such, the two congestion control techniques operate independently. The data rate control technique will limit the data transfer when controlling the BPU user data buffer, while the transmission window control technique limits the data transfer at TN congestion. In general, the data rate control algorithm controls the data rate responsive to a first feedback, e.g., air interface congestion feedback; As used herein, air interface congestion represents the congestion in the air interface between the BPU 200 and a wireless device 500 receiving packets from the BPU 200. As such, the first feedback represents feedback corresponding to the air interface congestion between the BPU 200 and the wireless device 500 receiving packets from the BPU 200. Examples of the first feedback include, but are not limited to, user data buffer feedback (e.g., delay and/or volume), air interface user bit rate, Hybrid Automatic Repeat Request (HARQ) feedback (e.g., HARQ retransmission feedback and/or HARQ transmission feedback), acknowledged packets feedback (e.g., highest successfully delivered PDCP sequence number), transmitted packets feedback (e.g., a measurement of the transmitted packets not yet acknowledged), etc. Further, the transmission window control algorithm controls (increases/decreases/maintains) the transmission window size responsive to second feedback, e.g., transport network congestion feedback, which is independent from the first feedback, such that the volume of in-flight packets may not exceed the determined transmission window size. As used herein, transport network congestion represents the congestion associated with a transport network interface between the PPU 100 and a BPU 200. Thus, the second feedback represents feedback corresponding to the transport network congestion of a transport interface between the PPU 100 and the BPU 200. Examples of the second feedback include, but are not limited to, packet loss feedback, packet timing feedback (e.g., packet delay/latency/RTT feedback), delay variation feedback, Explicit Congestion Notification (ECN) feedback, other congestion notifications, Active Queue Management (AQM) feedback, etc. By overlaying the two congestion control techniques, the solution presented herein achieves the benefit of both a high performance data rate control and TCP compatibility. The solution presented herein enables a PPU 100 to implement the overlaid flow control to provide user data to one or more BPUs 200 responsive to different forms of feedback provided by the BPU 200.

Figure 2:
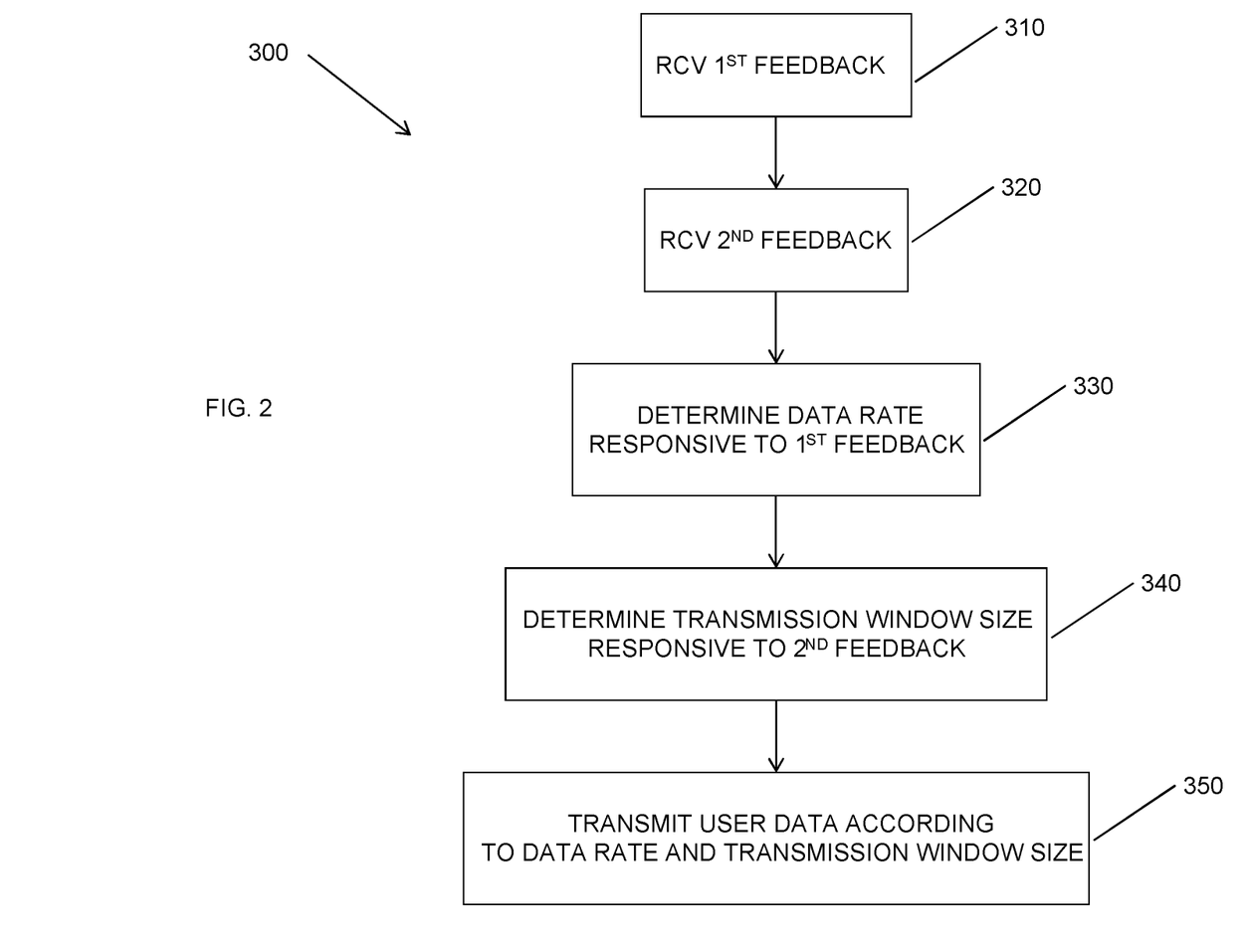
FIG. 2 shows a congestion control method as implemented by the PPU according to one exemplary embodiment.

FIG. 2 shows one exemplary method 300 for implementing the solution presented herein at the PPU 100. PPU 100 receives first feedback corresponding to air congestion (block 310) and receives second feedback corresponding to Transport Network (TN) congestion (block 320). In some embodiments, the first feedback comprises user data buffer feedback (or any other air interface congestion feedback options, e.g., those discussed above). In some exemplary embodiments, the second feedback may comprise a TN congestion indicator (or any other TN congestion feedback options, e.g., those discussed above), while in other exemplary embodiments, the second feedback may comprise a window size determined by the BPU 200 responsive to the TN congestion. The PPU 100 determines a data rate responsive to the first feedback (block 330), and determines a transmission window size responsive to the second feedback (block 340). PPU 100 then transmits the user data to the BPU 200 according to both the determined data rate and the determined transmission window size (block 350). In other words, the PPU 100 satisfies the requirements levied by both the data rate control technique and the transmission window control technique when transmitting data to the BPU 200.

Figure 3:
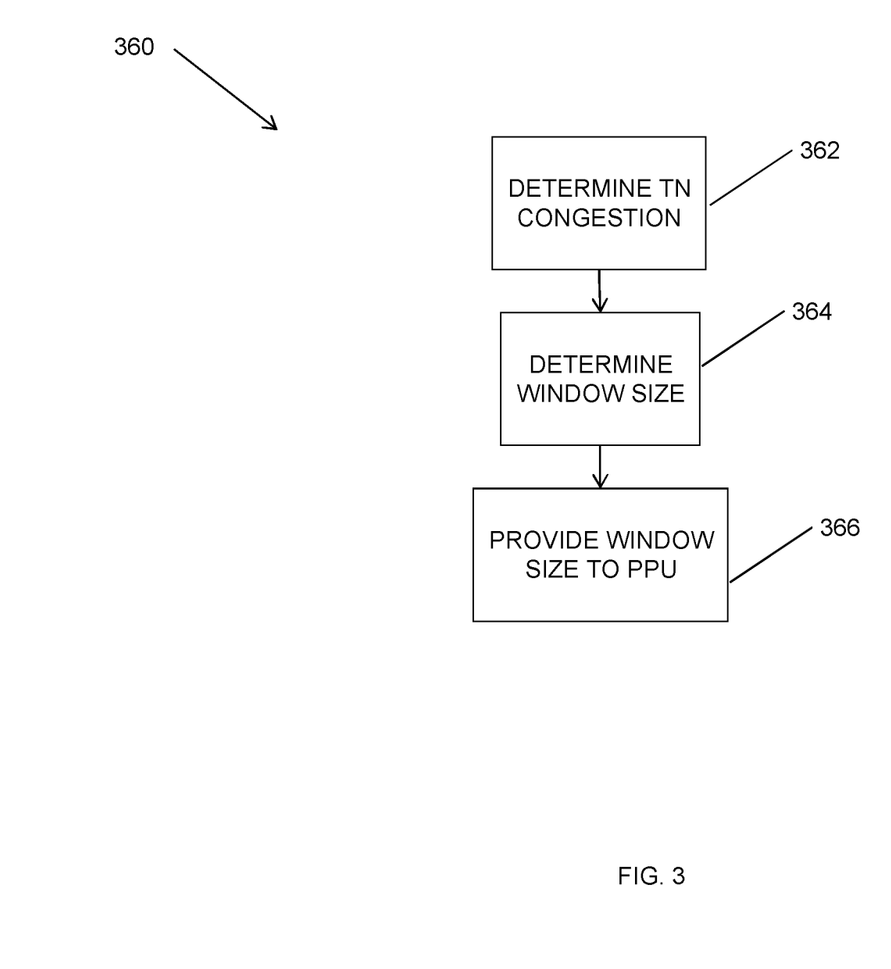
FIG. 3 shows a feedback method implemented by the BPU according to one exemplary embodiment.

FIG. 3 shows one exemplary method 360 implemented at the BPU 200 for facilitating the TN congestion control at the PPU 100. In this exemplary embodiment, BPU 200 determines TN congestion (block 362), e.g., by measuring incoming data packets on the transport interface. Such measuring operations typically include the measurement of lost packets and/or a delay associated with received data packets (e.g., via the time stamp associated with the received data packets). The BPU 200 then determines a window size responsive to the determined TN congestion (block 364). For example, the BPU 200 may measure incoming data packets by measuring the packet loss and/or delay associated with the incoming data packets. The determined window size defines the volume of packets that may be in-flight between the PPU 100 and the BPU 200, and/or the PPU 100 and the wireless device 500, at an end of a processing interval. For example, the determined window size may be a receive window size defining the volume of in-flight packets between the PPU 100 and the wireless device 500, or the determined window size may be a transmission window size defining the volume of in-flight packets to be transmitted by the PPU 100 to the BPU 200, at an end of a processing interval. The BPU 200 sends the determined window size to the PPU 100 (block 366). Because the window size received by the PPU 100 was determined responsive to the TN congestion, the window size provided by the BPU 100 serves as a different form of TN congestion feedback that the PPU 100 can use to determine the transmission window size, e.g., either by determining the transmission window size from the receive window size or by using the received transmission window size as the transmission window size. It will be appreciated that BPU 200 also determines and provides the requisite first feedback, and other forms of the second feedback, necessary to implement the solution presented herein.

In one exemplary embodiment, data rate control may be executed according to the control algorithm disclosed in PCT Application No. PCT/SE2016050530, filed 3 Jun. 2016, which is incorporated herein by reference. The algorithm in the '530 application requires per bearer buffer feedback from the BPU including buffer dwell time (delay), user data rate, etc. It will be appreciated, however, that any data rate control technique that relies on air interface congestion feedback may be used. Generally, the data rate control technique limits the data rate of providing data to the BPU 200 responsive to an indication of air interface congestion between the PPU 100 and BPU 200, and otherwise allows the maximum data rate.

In one exemplary embodiment, the transmission window control technique provides Transport Network (TN) congestion control, which increases/decreases the transmission window size responsive to TN congestion feedback. For example, when the second feedback indicates the TN congestion is below a congestion threshold, the PPU 100 increases the transmission window size (up to a maximum transmission window size). When the second feedback indicates the TN congestion is at or above a congestion threshold, however, the PPU 100 decreases the transmission window size. In some embodiments, PPU 100 may implement an Additive Increase Multiplicative Decrease (AIMD) based algorithm (as for TCP congestion control), where the window experiences Multiplicative Decrease at TN congestion and Additive Increase when there is no or less TN congestion. In other exemplary embodiments, the transmission window control technique may be further refined to include different Multiplicative Decrease behaviors (back-off ratio, prohibit time) based on one or more congestion trigger (packet loss, delay build-up), for example, enabling relative bit rates between bearers. For example, PPU 100 may multiplicatively decrease the transmission window size according to a back-off ratio, e.g., a back-off ration proportional to the TN congestion. In general, the transmission window congestion control limits the size of the transmission window upon detection of congestion, e.g., TN congestion, and otherwise allows the transmission window size to increase up to a maximum size and/or be set to the maximum size. Once the transmission window size reaches the maximum size, no further increase is allowed.

As noted above, PPU 100 may use a congestion threshold to decide when to increase/decrease a transmission window size. For example, if the TN congestion feedback is below a congestion threshold, the PPU 100 may increase the transmission window size, while if the TN congestion feedback is at or above the congestion threshold, the PPU 100 may decrease the transmission window size. It will be appreciated that while such a threshold may be fixed and/or predetermined, it is also possible that the congestion threshold may comprise a variable threshold dependent upon the desired control objective, e.g., limit delay, avoid loss, etc., the specific type of transport network congestion information being evaluated, e.g., delay loss, etc., and the chosen algorithm for implementing the control. For example, if packet delay is the variable being used to evaluate the TN congestion, where the objective is to limit this delay and the chosen algorithm is a proportional control algorithm, the congestion threshold may be set to a desired maximum delay. In another embodiment, the loss may be the variable under evaluation, where the objective is to avoid loss and the algorithm is an either/or algorithm where one action is taken if the loss exceeds the threshold and another action is taken if the loss is below the threshold. In this case, the congestion threshold may be set such that the PPU 100 reacts to the first observed loss. For example, the congestion threshold may be set to 1 if packet loss is the TN congestion parameter of interest and it is desirable to avoid packet loss. It will be appreciated that a congestion threshold may be used for any of the increasing/decreasing transmission window size embodiments, including but not limited to those embodiments using the AIMD approach.

The solution presented herein is described in terms of the PPU 100 transmitting data packets while complying with the data rate and transmission window size determined by the two independent control techniques. In some embodiments, the PPU 100 may simply transmit data packets according to the determined data rate and transmission window size. In other embodiments, the PPU 100 may first schedule future transmissions responsive to the determined data rate and transmission window size, where the determined scheduling applies until the PPU 100 determines changes need to be made to the determined data rate and/or transmission window size, e.g., upon receipt of new feedback from the BPU 200. For example, the PPU 100 may determine the scheduling for the user data transmissions to the BPU 200 responsive to the determined data rate and transmission window size, and then uses the scheduling for the subsequent transmissions of user data to the BPU 200 bound by the determined data rate and transmission window size.

Figure 4:
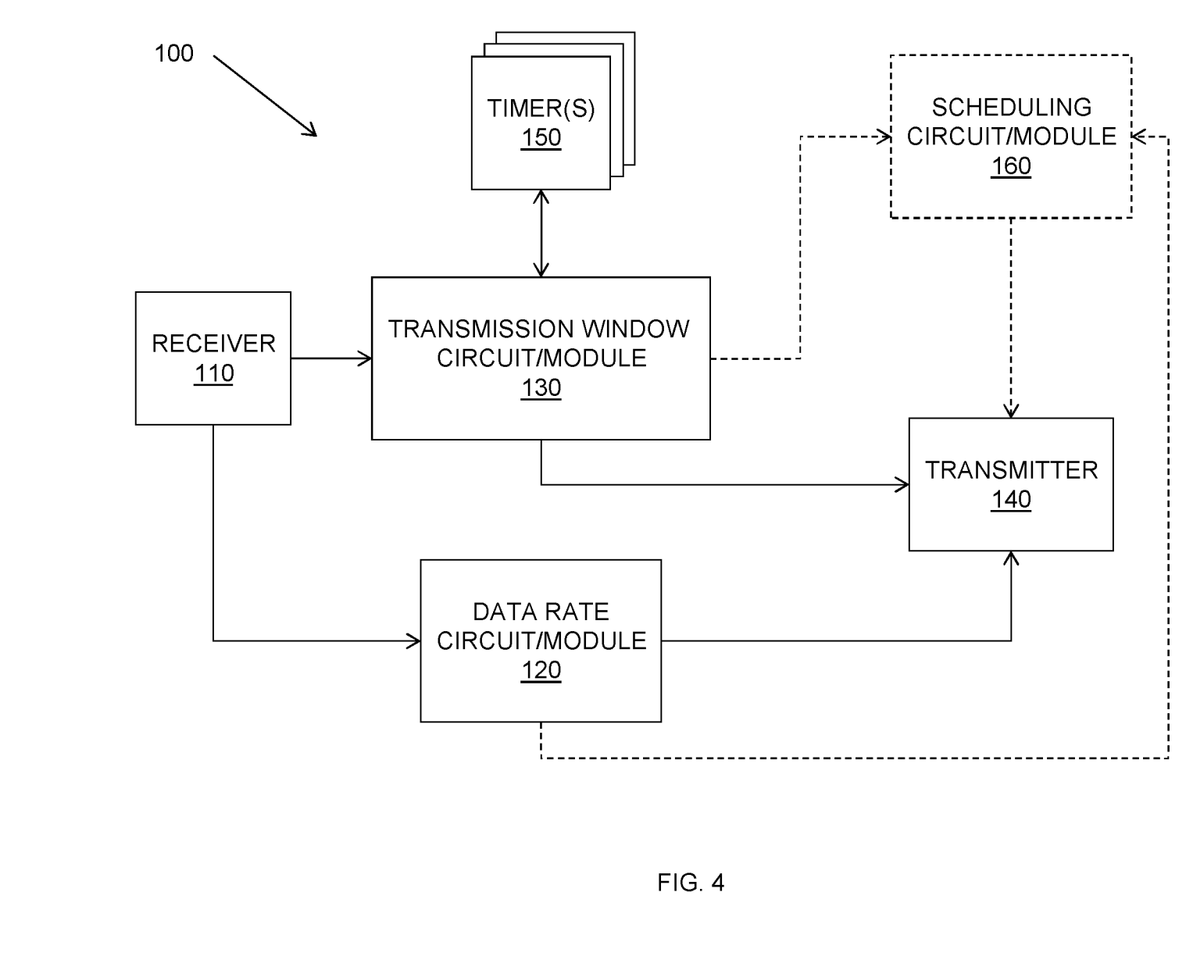
FIG. 4 shows a block diagram of one exemplary PPU.

FIG. 4 shows an exemplary PPU 100 configured to implement the method 300 of FIG. 2. The exemplary PPU 100 comprises a receiver 110, data rate circuit 120, transmission window circuit 130, and transmitter 140. Receiver 110 receives the first feedback corresponding to air congestion and receives second feedback corresponding to TN congestion. The data rate circuit 120 determines a data rate responsive to the first feedback, while the transmission window circuit 130 determines a transmission window size responsive to the second feedback. It will be appreciated that the transmission window circuit 130 may also determine any congestion thresholds necessary to implement the transmission window control technique. It will further be appreciated that the data rate circuit 120 may revise the determined data rate according to the determined transmission window size. For example, the data rate circuit 120 may determine a processing interval such that the data rate circuit 120 and the transmission window circuit 130 respectively determine the data rate and the transmission window size for each processing interval, where the data rate circuit 120 then revises the data rate (as necessary) to produce a data rate that provides an in-flight transmission volume of data defined by the transmission window size at an end of each processing interval. The transmitter 140 transmits the user data to the BPU 200 according to the determined data rate and the determined transmission window size.

In some embodiments, the PPU 100 may also comprise one or more timers 150, e.g., a "prohibit" timer, which prohibits any further changes to the transmission window size, or otherwise controls how/when the changes to the transmission window size may occur, until the timer 150 expires. Timer(s) 150 may also be used to define how often an increase to the transmission window size is allowed when there is no TN congestion.

Alternatively or additionally, PPU 100 may comprise a scheduling circuit 160. In this embodiment, the scheduling circuit 160 receives the determined data rate and transmission window size from the data rate circuit 120 and transmission window circuit 130, respectively, to determine the scheduling for the user data transmissions to the BPU 200. As such, the scheduling circuit 160 determines the scheduling responsive to both the determined data rate and the determined transmission window size, and then provides the scheduling to the transmitter 140. The transmitter 140 then transmits the user data to the BPU 200 according to the determined scheduling for as long as that scheduling is valid, e.g., until new feedback from the BPU 200 indicates a need or desire to change the data rate and/or transmission window size.

Figure 5:
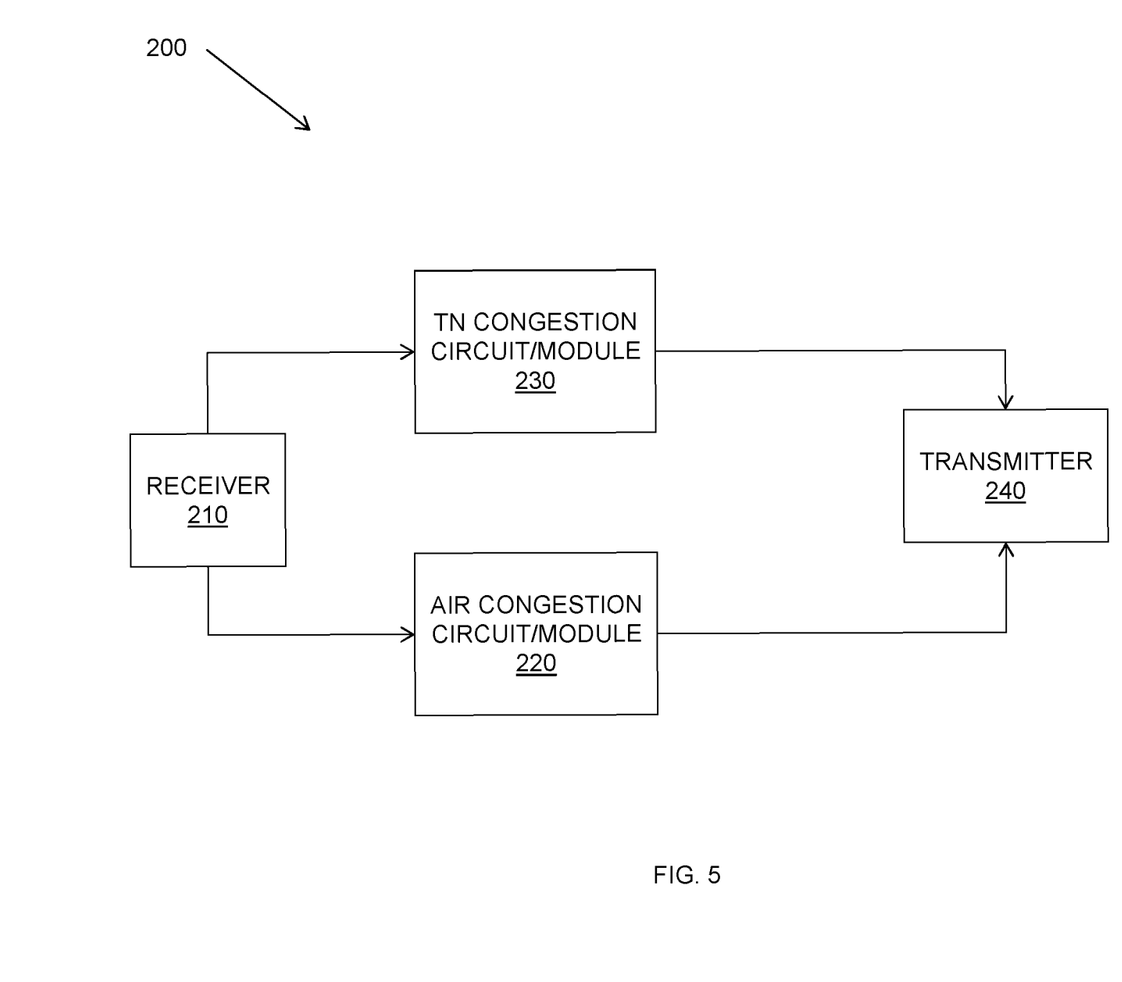
FIG. 5 shows a block diagram of one exemplary BPU.
Figure 6:
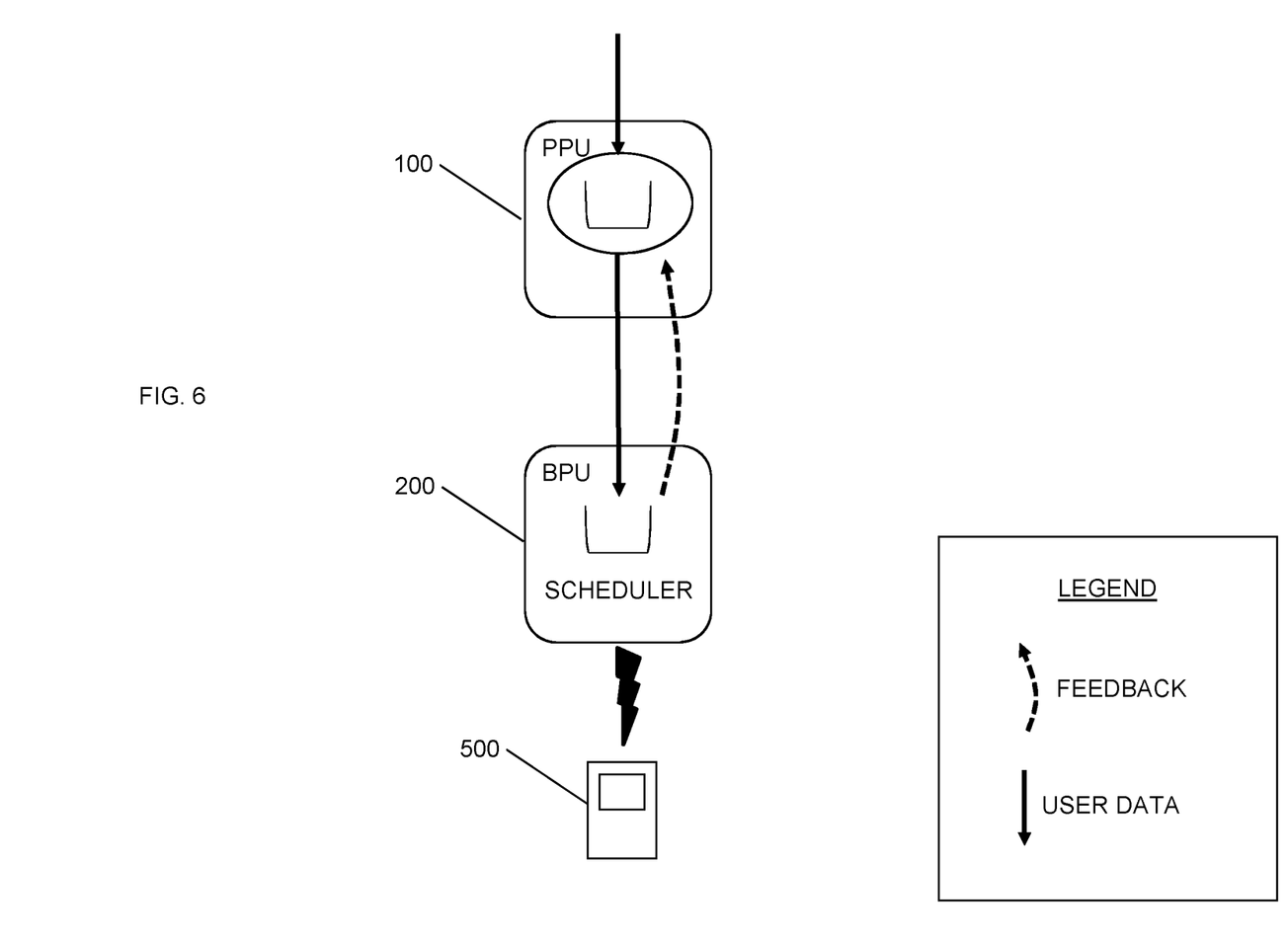
FIG. 6 shows a combination block diagram and congestion control method according to one exemplary embodiment.

FIG. 5 shows an exemplary BPU 200 configured to implement the method 360 of FIG. 3. BPU 200 comprises a receiver 210, air congestion circuit 220, TN congestion circuit 230, and transmitter 240. The receiver 210 receives user data from the PPU 100 and feedback from the wireless device 500 (FIG. 6). Responsive to the received feedback, the air congestion circuit 220 and TN congestion circuit 230 determine the first and second feedback for the PPU 100. Transmitter 240 transmits the first and second feedback to the PPU 100, as well as transmits user data packets to the wireless device. In some embodiments, the air congestion circuit 220 generates an indication of the air congestion, e.g., user data buffer feedback, air interface user bit rate feedback, Hybrid Automatic Repeat Request (HARQ) feedback (e.g., HARQ retransmission feedback and/or HARQ transmission feedback), acknowledged packets feedback (e.g., highest successfully delivered PDCP sequence number), transmitted packets feedback (e.g., a measurement of the transmitted packets not yet acknowledged), etc. In some embodiments, the TN congestion circuit 230 generates an indication of TN congestion, e.g., packet loss feedback, packet timing feedback (e.g., packet delay/latency/Round-Trip-Time (RTT) feedback), delay variation feedback, Explicit Congestion Notification (ECN) feedback, and/or other congestion notifications. In some embodiments the TN congestion circuit 230 uses the determined indication of the TN congestion to define a window size, e.g., a receive window size defining the volume of in-flight packets that can be received by receiver 210 or a transmit window size defining the number of in-flight packets that can be transmitted by the PPU 100. It will be appreciated that in these embodiments, the TN congestion circuit 230 may also determine a congestion threshold (or use a congestion threshold provided by the PPU 100) to determine the window size. The transmitter 240 may then transmit the window size, instead of the more direct TN congestion indicator(s), to the PPU 100 to indicate the presence (or not) of TN congestion to the PPU 100.

FIGS. 4 and 5 show exemplary circuits that may be used to implement the solution presented herein. While the solution is described in terms of the various circuits shown in FIGS. 4 and 5, those skilled in the art will appreciate that the circuits discussed herein may each be replaced with one or more modules configured to implement the solution presented herein, e.g., a receiver module 110, data rate module 120, a transmission window module 130, transmitter module 140, timer module(s) 150, scheduling module 160, receiver module 210, air congestion module 220, TN congestion module 230, and transmitter module 240.

Those skilled in the art will also appreciate that embodiments herein further include corresponding computer programs. A computer program comprises instructions which, when executed on at least one processor of a PPU 100 and/or BPU 200, cause the PPU 100 and/or BPU 200 to carry out any of the respective processes described above. A computer program in this regard may comprise one or more code modules corresponding to the means or units described above. Some embodiments may further include a carrier containing such a computer program. This carrier may comprise one of an electronic signal, optical signal, radio signal, or computer readable storage medium.

Figure 7:
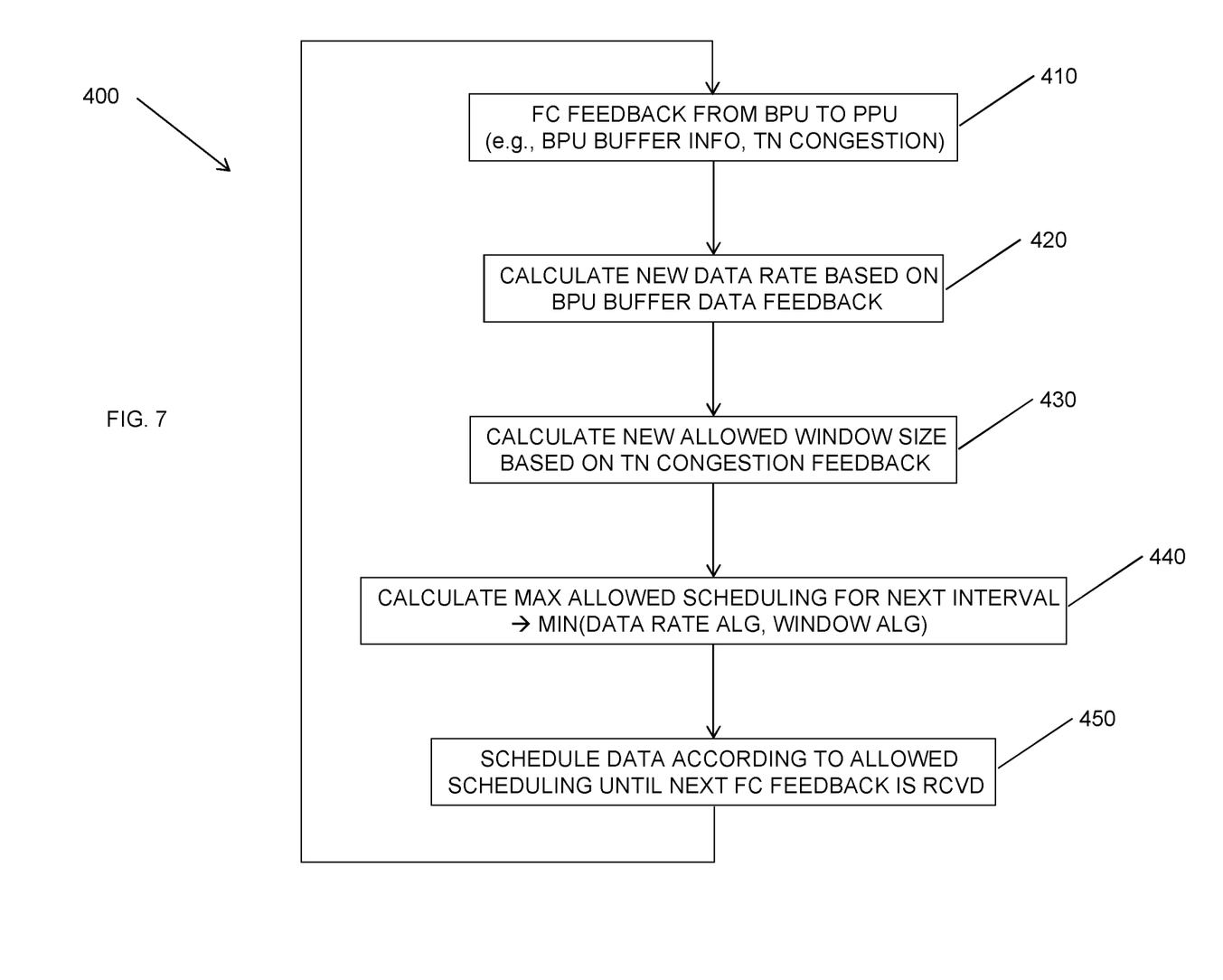
FIG. 7 shows a congestion control method as implemented by the PPU according to another exemplary embodiment.
Figure 8:
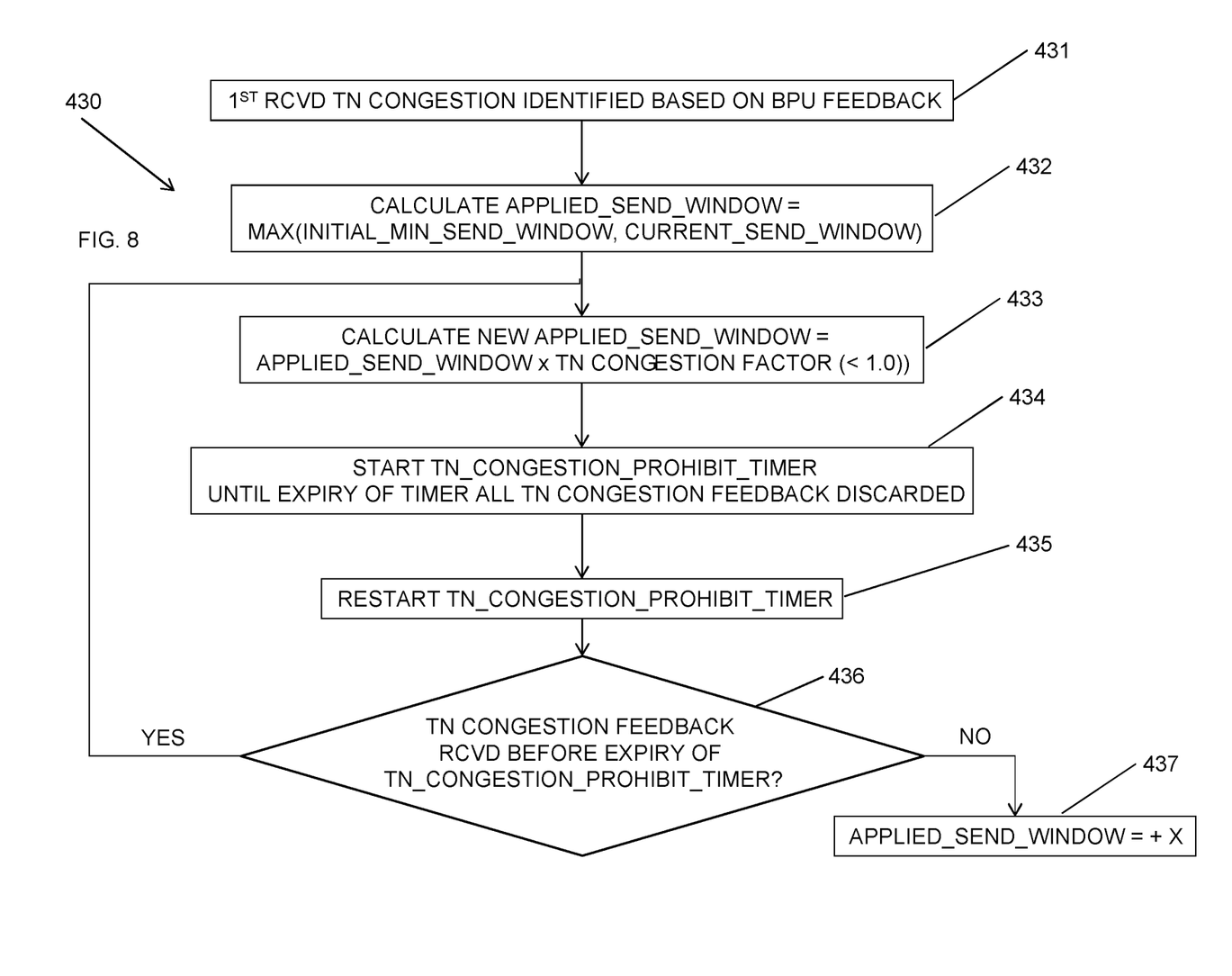
FIG. 8 shows TN congestion control as implemented by the PPU according to one exemplary embodiment.

FIGS. 6-8 show details for exemplary implementations of the solution presented herein. While FIG. 6 shows one PPU 100 in communication with one BPU 200, it will be appreciated that the PPU 100 may communicate with multiple BPUs 200, as shown in FIG. 1. In any event, PPU 100 executes separate congestion control algorithms to determine the data rate for transmitting data to the BPU 200 and to determine the transmission window size for transmitting data to the BPU 200. The BPU 200 conveys the user data packets to a wireless device 500 in the network, e.g., a cellphone, tablet, personal computer, or any other wireless device configured to receive data packets.

FIG. 7 shows additional details 400 for one exemplary implementation of method 300. In this exemplary embodiment, BPU 200 provides flow control (FC) feedback, e.g., air congestion feedback and TN congestion feedback to PPU 100 (block 410). The PPU 100 determines a data rate responsive to the air congestion feedback (block 420), and determines a transmission window size responsive to the TN congestion feedback (block 430). The PPU 100 may then determine a maximum allowed scheduling for transmitting user data until the next FC feedback is received from the BPU 200 (block 440). For example, PPU 100 may determine the maximum allowed scheduling according to min(data rate, transmission window size). The PPU 100 then schedules the data transmission to the BPU 200 according to the determined scheduling until the next FC feedback is received (block 450).

FIG. 8 shows one exemplary method 430 for implementing the transmission window control technique in the PPU 100. In this exemplary embodiment, the PPU 100 receives an indication of TN congestion based on TN congestion feedback from the BPU 200 (block 431). The PPU 100 calculates an initial transmission window size (block 432), and then calculates the new transmission window size responsive to the received TN congestion information (block 433). For example, the initial transmission window size may be reduced by a predefined percentage (block 434) and the PPU transmission smoothly adapts to this (an immediate adaptation to the new transmission window size can have negative effect on performance). The PPU 100 then starts a timer, e.g., a "prohibit" timer 150, which prohibits any further transmission window reduction when running (block 435). The prohibit timer 150 (or another timer 150) may also be used to define how often an additive increase is allowed when there is no TN congestion. While the prohibit timer 150 is running after the calculation of the new transmission window size, all TN congestion feedback will be discarded until expiration of the timer 150 (block 435), at which point the timer 150 may be restarted (or another timer 150 may be started) (block 436). If TN congestion feedback is not received before expiration of the restarted timer 150 (block 436), the PPU 100 increases the transmission window size (e.g., size increased by +X) (block 437). If TN congestion feedback is received before expiration of the restarted timer 150 (block 436), the PPU 100 will repeat blocks 433-435. In some embodiments, when the transmission window is back to maximum, the algorithm is suspended until the next TN congestion trigger.

It will be appreciated that the same timer 150 may be used in some embodiments to prohibit further changes after the transmission window size is determined, and to subsequently control how often the transmission window size may change. In other embodiments, one timer 150 (e.g., a "prohibit" timer 150) may be used in some embodiments to prohibit further changes after the transmission window size is determined, while a separate timer 150 (e.g., a "frequency" timer 150) may be used to subsequently control how often the transmission window size may change.

In some embodiments, the TN congestion trigger is sent from the BPU 200 to the PPU 100 as per bearer feedback. In some embodiments, this TN congestion trigger may be sent separately from the air interface congestion feedback, while in other embodiments, the TN congestion trigger can be integrated in the same message/packet as the air congestion interface feedback. In other embodiments, the BPU 200 may determine a window size (e.g., a receive or transmission window size) responsive to the TN congestion, and send the determined window size to the PPU 100, where the PPU 100 uses the received window size to indirectly determine the TN congestion and/or to determine the transmission window size.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein.

The invention claimed is:

1. A method of controlling congestion in a split radio access architecture, the split radio access architecture comprising a packet processing node operatively connected to one or more baseband processing nodes, the method comprising the packet processing node:
   receiving, from a baseband processing node, first feedback corresponding to air interface congestion between the baseband processing node and a wireless device receiving packets from the baseband processing node;
   receiving, from the baseband processing node, second feedback corresponding to transport network congestion of a transport interface between the packet processing node and the baseband processing node;
   determining a data rate for providing user data to the baseband processing node responsive to the first feedback;
   determining a transmission window size for providing the user data to the baseband processing node responsive to the second feedback; and
   transmitting the user data to the baseband processing node according to the determined data rate and the determined transmission window size.

2. A non-transitory computer readable recording medium storing a computer program product for controlling congestion in a split radio access architecture, the split radio access architecture comprising a packet processing node operatively connected to one or more baseband processing nodes, the computer program product comprising software instructions which, when run on processing circuitry of the packet processing node, causes the packet processing node to:
   receive, from a baseband processing node, first feedback corresponding to air interface congestion between the baseband processing node and a wireless device receiving packets from the baseband processing node;
   receive, from the baseband processing node, second feedback corresponding to transport network congestion of a transport interface between the packet processing node and the baseband processing node;
   determine a data rate for providing user data to the baseband processing node responsive to the first feedback;
   determine a transmission window size for providing the user data to the baseband processing node responsive to the second feedback; and
   transmit the user data to the baseband processing node according to the determined data rate and the determined transmission window size.

3. A packet processing node in a split radio access architecture, the split radio access architecture comprising the packet processing node and one or more baseband processing nodes, the packet processing node comprising:
   a receiver configured to:
      receive, from a baseband processing node, first feedback corresponding to air interface congestion between the baseband processing node and a wireless device receiving packets from the baseband processing node; and
      receive, from the baseband processing node, second feedback corresponding to transport network congestion of a transport interface between the packet processing node and the baseband processing node;
   a data rate circuit operatively connected to the receiver and configured to determine a data rate for providing user data to the baseband processing node responsive to the first feedback;
   a transmission window circuit operatively connected to the receiver and configured to determine a transmission window size for providing the user data to the baseband processing node responsive to the second feedback; and
   a transmitter configured to transmit the user data to the baseband processing node according to the determined data rate and the determined transmission window size to control congestion when providing the user data to the baseband processing node.

4. The packet processing node of claim 3:
   wherein the first feedback comprises air interface congestion feedback; and
   wherein the data rate circuit is configured to determine the data rate responsive to the air interface congestion feedback.

5. The packet processing node of claim 4, wherein the air interface congestion feedback comprises: user data buffer feedback, air interface user bit rate feedback, and/or hybrid automatic repeat request feedback.

6. The packet processing node of claim 3:
   wherein the second feedback comprises transport network congestion feedback; and
   wherein the transmission window circuit is configured to determine the transmission window size responsive to the transport network congestion feedback.

7. The packet processing node of claim 6, wherein the transport network congestion feedback comprises: congestion feedback, packet loss feedback, packet timing feedback, delay variation feedback, active queue management feedback, and/or explicit congestion notification.

8. The packet processing node of claim 3:
   wherein the second feedback comprises a first window size defining a volume of in-flight data packets between the packet processing node and the wireless device receiving packets from the baseband processing node, the first window size determined by the baseband processing node responsive to transport network congestion information; and wherein the transmission window circuit is configured to determine the transmission window size from the first window size.

9. The packet processing node of claim 8, wherein the first window size comprises a receive window size for receiving data packets from the packet processing node.

10. The packet processing node of claim 8, wherein the first window size comprises the transmission window size for transmitting packets by the packet processing node.

11. The packet processing node of claim 3:

further comprising a timer operatively coupled to the transmission window circuit, the timer configured to start responsive to the determination of the transmission window size; and wherein the transmission window circuit prohibits further adjustment of the transmission window size until expiration of the timer.

12. The packet processing node of claim 3, wherein the transmission window circuit determines the transmission window size by:

increasing the transmission window size when the second feedback indicates the transport network congestion is below a congestion threshold; and decreasing the transmission window size when the second feedback indicates the transport network congestion is at or above the congestion threshold.

13. The packet processing node of claim 12, wherein the transmission window circuit is configured to additively increase the transmission window size when the second feedback indicates the transport network congestion is below the congestion threshold.

14. The packet processing node of claim 12, wherein the transmission window circuit is configured to halt the increasing of the transmission window size when the transmission window size reaches a maximum transmission window size.

15. The packet processing node of claim 12, wherein the transmission window circuit is configured to increase the transmission window size by setting the transmission window size to a maximum transmission window size when the second feedback indicates the transport network congestion is below the congestion threshold.

* * * * *